United States Patent [19]
Landries et al.

[11] Patent Number: 4,541,036
[45] Date of Patent: Sep. 10, 1985

[54] LATCH FOR TERMINAL BLOCK

[75] Inventors: Richard V. Landries, Warren, Ohio; Robert A. Ress, Jr., Tequesta, Fla.

[73] Assignee: General Motors Corporation, Detroit, Mich.

[21] Appl. No.: 628,589

[22] Filed: Jul. 6, 1984

[51] Int. Cl.³ .............................................. H05K 7/12
[52] U.S. Cl. ..................................... 361/426; 220/3.6; 220/306; 248/27.3; 339/128
[58] Field of Search .............. 361/346, 400, 417, 419, 361/420, 426; 174/151, 153 R; 339/91 R, 75 M, 128; 248/27.3; 220/3.6, 306; 200/295, 296; 24/293, 297, 588

[56] References Cited

U.S. PATENT DOCUMENTS

| | | | |
|---|---|---|---|
| 3,523,269 | 8/1970 | Witak, Jr. | 339/91 R |
| 3,645,353 | 2/1972 | Cope | 248/27.3 |
| 3,793,563 | 2/1974 | Brefka | 361/346 |
| 3,989,343 | 11/1976 | Lucias | 339/128 |
| 4,227,238 | 10/1980 | Saito | 361/417 |
| 4,340,795 | 7/1982 | Arthur | 200/296 |

Primary Examiner—G. P. Tolin
Attorney, Agent, or Firm—Saul Schwartz

[57] ABSTRACT

A latch for releasably maintaining a terminal block in an installed position in a panel aperture includes a U-shaped frame, guides on the terminal block at a leading edge thereof integral with the distal ends of the parallel arms of the frame supporting the latter on the terminal block in cantilever spring fashion and defining a lead-in surface in longitudinal profile, and a latch arm supported on the frame between the support arms in cantilever spring fashion including a ramp at its distal end extending from above the frame to inboard of the lead-in surface. As the terminal block approaches the installed position, the guides facilitate final movement thereto while the relationship between the ramp and the lead-in surface insures that the edge of the aperture will engage the latch arm only on the ramp thereby to prevent misengagement between the latch arm and the panel.

6 Claims, 3 Drawing Figures

LATCH FOR TERMINAL BLOCK

BACKGROUND OF THE INVENTION

1. Field of the Invention

This invention relates generally to panel mounting arrangements for electrical connectors or terminal blocks and, more particularly, to a new and improved latch for releasably retaining a connector or terminal block in an installed position on a panel.

2. Description of the Prior Art

Installation of a wiring harness in an automobile is facilitated by the provision of separable connector assemblies at locations where the harness is routed through a partition or bulkhead. Typically, one half of the connector assembly is configured for snap-in attachment to the partition in an aperture thereof and the other half is configured for plug-in attachment to the first half. Alternatively, a terminal block is configured for snap-in attachment to the partition and the connector halves are configured for plug-in attachment to the terminal block from opposite sides of the partition. In either case, a panel latch suitable for blind assembly is a desirable feature in either the connector or terminal block. To that end, one connector proposal has a pair of spaced, cantilever spring latch arms extending in one direction and a single cantilever spring latch arm therebetween extending in the opposite direction. Ramps on the ends of all three arms facilitate installation from either side of the partition and shoulders on each arm snaps behind the partition in an installed position of the connector to retain the latter on the partition. In a proposal related to attaching one connector half to another, a U-shaped support is attached to the connector in cantilever spring fashion and carries, also in cantilever spring fashion, a latch arm which engages an abutment on the other connector half to retain the two together. A latch according to this invention represents a novel alternative to these and other known panel latches and incorporates structure which facilitates alignment of the terminal block for blind assembly and positively prevents misengagement of the latch arm and the panel.

SUMMARY OF THE INVENTION

Accordingly, the primary feature of this invention is that it provides a new and improved latch for retaining a terminal block in an installed position in an aperture in a panel. Another feature of this invention resides in the provision in the new and improved latch of a latch arm supported on a frame in cantilever spring fashion which frame itself is supported on the terminal block in cantilever spring fashion by a pair of guides adjacent a leading edge of the terminal block, the guides defining a smooth lead-in surface for facilitating blind installation of the terminal block. Still another feature of this invention resides in the provision in the new and improved latch of a ramp on the latch arm extending from above the frame to a position inboard of the smooth lead-in surface so that as the terminal block is moved to the installed position in the panel aperture only the ramp is exposed for engagement on a marginal edge of the panel aperture thereby to prevent misengagement between the panel and the latch arm. Yet another feature of this invention resides in the provision in the new and improved latch of a stop on the frame which limits cantilever spring flexure thereof to avoid over stressing.

These and other features of this invention will be readily apparent from the following specification and from the drawings wherein.

Figure 1:
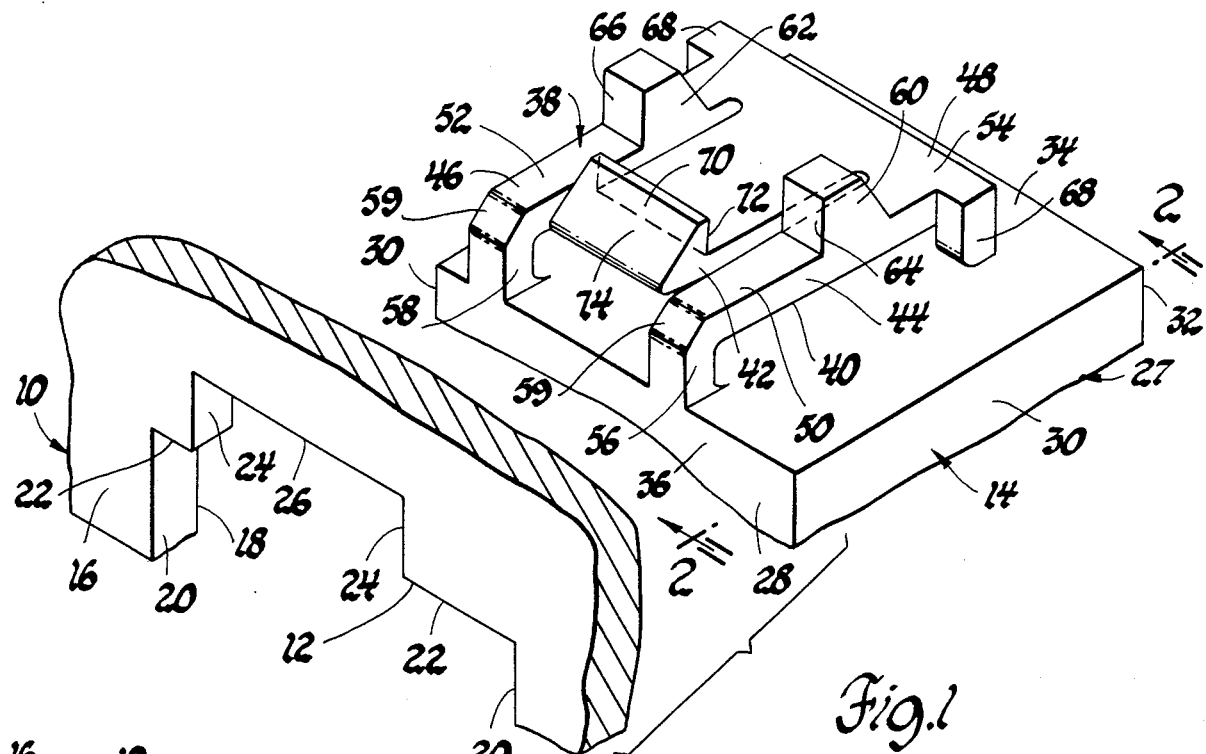
FIG. 1 is a fragmentary perspective view of a terminal block including a new and improved latch according to this invention.

Referring now to FIG. 1 of the drawings, a vertically oriented partition or panel 10 has an aperture 12 therein adapted for reception of a schematically illustrated terminal block 14. The panel 10 has a front side 16 and a back side 18. The aperture 12 includes a pair of vertical sides 20, a horizontal top 22, and a key portion in the top defined by a pair of side edges 24 and a top marginal edge 26.

The terminal block 14 includes a rectangular body 27 having a front side 28, a pair of lateral sides 30, a back side 32 and a top side 34. The top side 34 intersects the front side 28 at a leading edge 36 of the terminal block. The terminal block 14 has an installed position, not shown, in the aperture 12 and is moved thereinto from the back side 18 of the panel. The terminal block is maintained in the installed position by a latch 38 according to this invention. While the latch 38, in the illustrated embodiment, cooperates with the panel 10 to hold the terminal block 14 in the aperture 12, it will be apparent that it may equally function to hold a connector in a panel aperture.

The latch 38 includes a generally U-shaped frame 40 and a latch arm 42. The frame 40 includes a pair of parallel, spaced, support arms 44 and 46 interconnected by an integral cross member 48. An upper side 50 of the support arm 44 lies in a common plane with a corresponding upper side 52 of the support arm 46 and an upper side 54 of the cross member 48. A pair of guides 56 and 58 at the leading edge 36, integral with the terminal block 14 and with the support arms 44 and 46, respectively, attach the frame 40 to the terminal block in cantilever spring fashion for flexure generally at the leading edge 36 and cooperate in defining a smooth lead-in surface 59 extending from the leading edge 36 to the plane containing upper sides 50, 52, and 54 of the frame 40. A pair of abutments 60 and 62 in the arms 44 and 46, respectively, define a corresponding pair of shoulders 64 and 66 perpendicular to upper sides 50 and 52. A pair of depending stops 68 at opposite ends of the cross member 48 limit cantilever spring flexure of the frame 40 in the direction of top side 34 of the terminal block.

Figure 2:
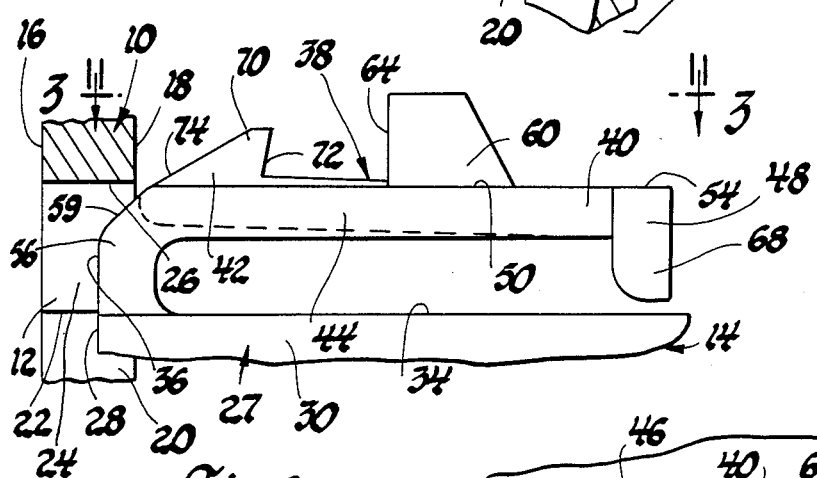
FIG. 2 is an enlarged view taken generally along the plane indicated by line 2—2 in FIG. 1.
Figure 3:
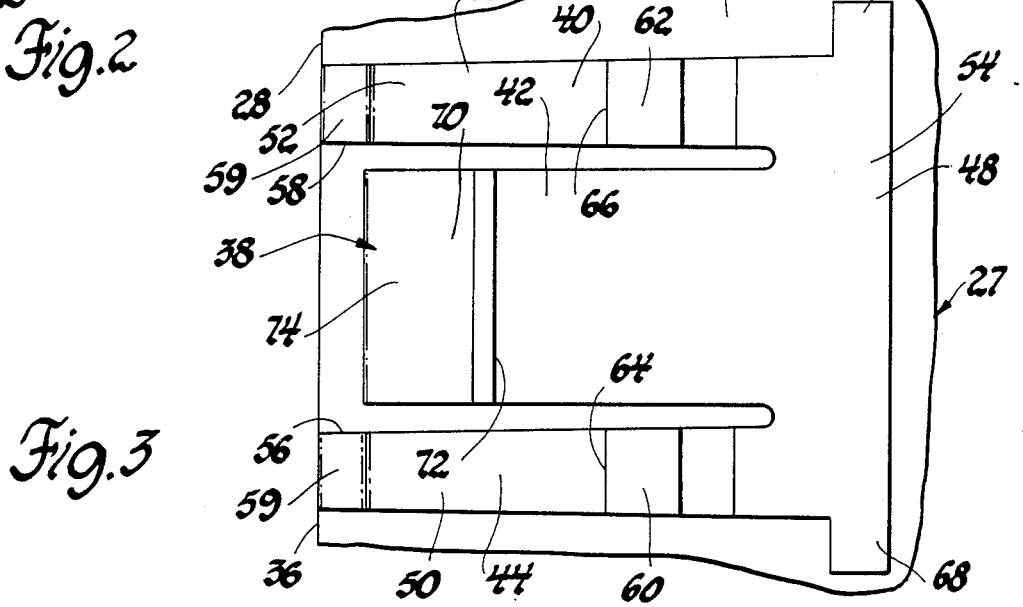
FIG. 3 is a plan view taken generally along the plane indicated by lines 3—3 in FIG. 2.

The latch arm 42 is integrally connected to the cross member 48 of the frame 40 between the support arms 44 and 46 so that the latch arm is supported on the frame in cantilever spring fashion. An abutment 70 on the distal end of latch arm 42 defines, on a back-facing side, a generally vertical shoulder 72 and, on a front-facing side, a ramp 74. Compressive force applied on the ramp 74 flexes the latch arm 42 counterclockwise, FIG. 2, and concurrently the U-shaped frame 40 clockwise about their respective connections to the frame and to the guides 56 and 58. In an unflexed condition of the latch arm 42 and the frame 40, FIG. 2, the ramp 74 extends from above the plane defined by the upper sides 50, 52 and 54 to inboard of the lead-in surface 59. The angle of the ramp 74 is such that in the unflexed condition of the latch arm the ramp is substantially tangent to the curvature to the lead-in surface so that a generally straight, continuous edge is defined in longitudinal profile, FIG. 2.

Describing now the the operation of the latch 38, the terminal block 14 may be provided with a bracket or like arrangement on its lower side, not shown, adapted to hook onto the lower marginal edge of the aperture 12 when the terminal block is tilted with respect to the plane of the panel. The terminal block 14 may then be pivoted counterclockwise, FIG. 1, toward the installed position in the aperture. As the leading edge 36 approaches the aperture 12, any misalignment between the guides 56 and 58 and the key portion defined by the side edges 24 and the top marginal edge 26 results in harmless interference engagement between one or the other of the guides 56 and 58 and the back side 18 of the panel so that the terminal block 14 cannot be fully positioned until properly aligned by slight lateral shifting of the terminal block.

Assuming the terminal block to be laterally centered in the aperture, slight vertical misalignment between the aperture 12 and the terminal block results in interference engagement between the lead-in surface 59 defined by the guides 56 and 58 and the top marginal edge 26 of the key portion of the aperture. The lead-in surface is sufficiently smoothly curved so that continued pivotal movement of the terminal block 14 toward the installed position results in a camming action on the lead-in surface causing the terminal block to seat in the aperture. When the terminal block is properly seated, the plane defined by the upper sides 50, 52 and 54 of the frame 40 coincides with the top marginal edge 26 of the panel as the terminal block approaches the installed position defined by engagement between the shoulders 64 and 66 on the abutments 60 and 62, respectively, and the back side 18 of the panel 10.

With respect to the latch arm 42, because the ramp 74 extends from above the frame 40 to inboard of the lead-in surface 59, the only portion of the arm engageable by the top marginal edge 26 of the panel is the ramp so that misengagement between the panel and latch arm is foreclosed. As the terminal block approaches the installed position, the top marginal edge 26 of the panel contacts the ramp 74 and exerts a reaction force thereon causing counterclockwise resilient flexure of the latch arm and clockwise resilient flexure of the frame 40 until the abutment 70 on the latch arm passes beneath the top marginal edge 26. The terminal block 14 achieves the installed position when back side 18 of the panel is engaged by the shoulders 64 and 66 on the abutments 60 and 62, respectively. Concurrently, the shoulder 72 on the abutment 70 on the latch arm passes beneath the intersection of the front side 16 of the panel and the top marginal edge 26 whereupon the shoulder snaps behind the front side to capture the panel between the shoulder 72 and the shoulders 64 and 66. The shoulder 72 prevents withdrawal of the terminal block 14 from the panel 10 so that the terminal block is effectively latched to the panel. Should it be necessary to remove the terminal block, manual pressure on the ramp 74 flexes the latch arm 42 and the U-shaped frame 40 to permit reverse passage of the abutment 70 beneath the top marginal edge 26 for simple withdrawal of the terminal block.

The embodiments of the invention in which an exclusive property or privilege is claimed are defined as follows:

1. In combination with a panel having an aperture therein and a terminal block having a laterally extending leading edge along one side thereof, said terminal block being moveable from one side of said panel into an installed position in said aperture wherein at least a portion of said one side of said terminal block is separated from an adjacent marginal edge of said aperture, a latch comprising, a U-shaped frame including a pair of parallel support arms, guide means on said terminal block at said leading edge rigidly connected to a distal end of each of said parallel arms whereby said frame is supported on said terminal block in cantilever spring fashion generally parallel to said one side of said terminal block and against said aperture marginal edge in said installed position of said terminal block, said guide means defining a smooth lead-in surface to guide said frame under said marginal edge during movement of said terminal block to said installed position, abutment means on said frame engageable on said one side of said panel to limit penetration of said terminal block into said aperture to said installed position, a latch arm supported on said frame in cantilever spring fashion between said parallel support arms, means on a distal end of said latch arm defining a shoulder engageable on the side of said panel opposite said one side in said installed position of said terminal block to prevent withdrawal of said terminal block from said aperture, and means on said distal end of said latch arm defining a ramp extending from above said frame to inboard of said lead-in surface in an unflexed position of said latch arm so that said ramp is the only portion of said latch arm engageable on said aperture marginal edge during movement of said terminal block to said installed position.

2. The latch recited in claim 1 wherein said U-shaped frame includes a cross member between and integral with each of said parallel support arms and said latch arm extends from and is integral with said cross member.

3. The latch recited in claim 2 wherein each of said guide means is integral with said terminal block and with a corresponding one of said parallel support arms.

4. The latch recited in claim 3 further including, a stop on said frame engageable on said one side of said terminal block to limit cantilever spring flexure of said frame relative to said terminal block.

5. The latch recited in claim 4 wherein said abutment means on said frame includes a pair of abutments integral with respective ones of said parallel support arms.

6. The latch recited in claim 5 wherein said guide means lead-in surface and said ramp on said latch arm define a generally straight continuous edge in longitudinal profile in said unflexed position of said latch arm.

* * * * *